(12) United States Patent
Vompe (10) Patent No.: US 10,412,007 B1
(45) Date of Patent: Sep. 10, 2019

(54) METHOD AND SYSTEM FOR DETERMINING BALANCED TRAFFIC FLOWS FOR NETWORK CAPACITY PLANNING

(71) Applicant: JPMorgan Chase Bank, N.A., New York, NY (US)

(72) Inventor: Dimitri Vompe, Dublin, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 544 days.

(21) Appl. No.: 14/561,668

(22) Filed: Dec. 5, 2014

Related U.S. Application Data

(60) Provisional application No. 61/915,689, filed on Dec. 13, 2013.

(51) Int. Cl.
*H04L 12/803* (2013.01)
*H04L 12/26* (2006.01)

(52) U.S. Cl.
CPC ........ H04L 47/125 (2013.01); H04L 43/0876 (2013.01)

(58) Field of Classification Search
CPC ... H04L 47/125; H04L 43/0876; H04L 45/02; H04L 47/10
USPC .......................................................... 709/224
See application file for complete search history.

(56) References Cited

U.S. PATENT DOCUMENTS

| | | | |
|---|---|---|---|
| 5,596,722 A * | 1/1997 | Rahnema | H04B 7/1858 370/400 |
| 6,466,980 B1 | 10/2002 | Lumelsky et al. | |
| 6,502,131 B1 * | 12/2002 | Vaid | H04L 1/1854 709/224 |
| 6,578,068 B1 | 6/2003 | Bowman-Amuah | |
| 6,788,646 B1 * | 9/2004 | Fodor | H04L 12/5602 370/229 |
| 6,804,714 B1 * | 10/2004 | Tummalapalli | H04L 41/5009 707/999.003 |
| 7,363,371 B2 | 4/2008 | Kirkby et al. | |
| 7,536,002 B1 | 5/2009 | Ma et al. | |
| 8,121,944 B2 | 2/2012 | Norman et al. | |
| 8,374,333 B1 | 2/2013 | Ma et al. | |
| 8,396,798 B2 | 3/2013 | Norman et al. | |
| 8,589,541 B2 * | 11/2013 | Raleigh | H04L 41/0893 709/224 |
| 8,687,790 B2 | 4/2014 | Ma et al. | |

(Continued)

*Primary Examiner* — Kevin T Bates
*Assistant Examiner* — Ronak Patel
(74) *Attorney, Agent, or Firm* — Hunton Andrews Kurth LLP (57) ABSTRACT

An automated computer implemented method and system for determining balanced traffic flows comprises: automatically identifying, via a computer processor, current device count configuration for a communication link comprising a first end point and a second end point where the communication link is part of a network; determining a flow intensity for the communication link wherein the flow intensity comprises a first transmit intensity and a first receive intensity for the first end point and a second transmit intensity and a second receive intensity for the second end point; determining a flow matrix for the communication link where the flow matrix is proportional to the flow intensity of the first end point and the second end point; and providing the flow matrix to a network capacity planning tool for flow matrix deployment for the network.

12 Claims, 7 Drawing Sheets

(56) References Cited

U.S. PATENT DOCUMENTS

| | | | |
|---|---|---|---|
| 8,811,177 B1 | 4/2014 | Toudeh-Fallah et al. | |
| 8,959,218 B2* | 2/2015 | Finkelstein | H04N 21/2402 |
| | | | 709/203 |
| 8,995,643 B2 | 3/2015 | Ma et al. | |
| 9,426,036 B1* | 8/2016 | Roy | H04L 41/147 |
| 9,722,929 B2* | 8/2017 | Miklos | H04L 47/24 |
| 2003/0059026 A1* | 3/2003 | Brugnnan | H04M 3/36 |
| | | | 379/229 |
| 2005/0154620 A1 | 7/2005 | Hentschel et al. | |
| 2005/0163047 A1 | 7/2005 | McGregor et al. | |
| 2005/0220088 A1 | 10/2005 | Smith et al. | |
| 2005/0286434 A1* | 12/2005 | McKee | H04L 43/022 |
| | | | 370/252 |
| 2007/0159965 A1* | 7/2007 | Kopf | H04L 47/12 |
| | | | 370/229 |
| 2008/0250135 A1* | 10/2008 | Pradhan | H04L 12/66 |
| | | | 709/224 |
| 2009/0180480 A1* | 7/2009 | Hilt | H04L 45/00 |
| | | | 370/395.21 |
| 2011/0142025 A1* | 6/2011 | Agee | H04B 7/0413 |
| | | | 370/342 |
| 2011/0302027 A1* | 12/2011 | Dibirdi | G06Q 30/0251 |
| | | | 705/14.49 |
| 2012/0033567 A1* | 2/2012 | Yamada | H04L 45/125 |
| | | | 370/252 |
| 2012/0039161 A1* | 2/2012 | Allan | H04L 45/06 |
| | | | 370/216 |
| 2012/0215684 A1* | 8/2012 | Kidron | G06F 15/167 |
| | | | 705/39 |
| 2014/0052847 A1* | 2/2014 | Jadallah | H04L 43/0876 |
| | | | 709/224 |
| 2015/0081847 A1* | 3/2015 | Hao | H04L 65/602 |
| | | | 709/219 |
| 2015/0103646 A1* | 4/2015 | Tourrilhes | H04L 47/125 |
| | | | 370/229 |
| 2015/0149620 A1* | 5/2015 | Banerjee | H04L 41/14 |
| | | | 709/224 |
| 2015/0271004 A1* | 9/2015 | Agee | H04B 7/0413 |
| | | | 370/330 |
| 2016/0149816 A1* | 5/2016 | Wu | H04L 45/245 |
| | | | 370/235 |

* cited by examiner

METHOD AND SYSTEM FOR DETERMINING BALANCED TRAFFIC FLOWS FOR NETWORK CAPACITY PLANNING

CROSS REFERENCE TO RELATED APPLICATIONS

This application claims priority to provisional application, U.S. patent application No. 61/915,689, filed Dec. 13, 2013, the contents of which are incorporated herein by reference in its entirety.

FIELD OF THE INVENTION

The present invention generally relates to a method and system for creating and maintaining balanced traffic flows based on deployment volumes.

BACKGROUND OF THE INVENTION

In general, network topology refers to an arrangement of various elements and devices of a computer network. The devices may be include edge devices and internal devices. Each device has a capacity and can transmit and receive information. The amount of flow, however, cannot exceed the capacity of the device. In general, the amount of flow into a node equals the amount of flow out of it. If the node is a source, it can have more outgoing flow. If the node is a sink, it can have more incoming flow. Current systems do not account for usage and device management and thereby fail to achieve balanced traffic flow efficiencies.

Other drawbacks may also be present.

SUMMARY OF THE INVENTION

Accordingly, one aspect of the invention is to address one or more of the drawbacks set forth above. According to an embodiment of the present invention, a method for determining balanced traffic flows for network capacity planning, wherein the method is executed by a programmed computer processor which communicates with a user via a network, comprises the steps of: automatically identifying, via a computer processor, a first current device count configuration for a first end point and a second current device count configuration for a second end point where the first end point forms a communication link with the second end point where the communication link is part of a network; determining, via a computer processor, a first flow intensity for the first end point based at least in part on the first current device count configuration wherein the first flow intensity comprises a first transmit intensity and a first receive intensity for the first end point; determining, via a computer processor, a second flow intensity for the second end point of the communication link based at least in part on the second current device count configuration wherein the second flow intensity comprises a second transmit intensity and a second receive intensity for the second end point; determining, via a computer processor, a flow matrix for the communication link where the flow matrix is proportional to the first flow intensity of the first end point and the second flow intensity of the second end point; and providing, via a computer processor, the flow matrix to a network capacity planning tool for flow matrix deployment for the network.

In other exemplary embodiments, the preceding method may be performed using a system with a processor and a memory comprising computer-readable instructions which when executed by the processor cause the processor to perform the method steps.

According to another embodiment of the present invention, an automated computer implemented system for determining balanced traffic flows for network capacity planning comprises a device module comprises: a computer processor configured to automatically identify a first current device count configuration for a first end point and a second current device count configuration for a second end point where the first end point forms a communication link with the second end point where the communication link is part of a network; a flow intensity module comprising a computer processor configured to determine a first flow intensity for the first end point based at least in part on the first current device count configuration wherein the first flow intensity comprises a first transmit intensity and a first receive intensity for the first end point; and further configured to determine a second flow intensity for the second end point of the communication link based at least in part on the second current device count configuration wherein the second flow intensity comprises a second transmit intensity and a second receive intensity for the second end point; a flow matrix module comprising a computer processor configured to determine a flow matrix for the communication link where the flow matrix is proportional to the first flow intensity of the first end point and the second flow intensity of the second end point; and an interface configured to provide the flow matrix to a network capacity planning tool for flow matrix deployment for the network.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DETAILED DESCRIPTION OF EXEMPLARY EMBODIMENT(S)

An embodiment of the present invention is directed to a methodology for creating balanced traffic flows based on the information regarding per-site deployment of traffic sinks and/or sources. For example, based on the number of devices, an embodiment of the present invention may determine traffic patterns for network capacity planning. An exemplary application of the present invention may include modeling VoIP phone-to-phone flows over a core network. This is particularly useful for network capacity planning where limited information is available, e.g., deployment volumes such as number of VoIP phones. Other devices that communicate and/or exchange data may be considered as well.

An embodiment of the present invention is directed to creating point-to-point flows based on deployment volume at each point. Such methodology may be used for creating voice site-to-site flows based on a number of users and/or phones at each site, for example. In general terms, this methodology may be used for creating traffic flows based on the information about per-site deployment of traffic sinks/sources. An embodiment of the present invention provides a balanced approach in the sense that flow volumes between end-points may be proportional to an amount (e.g., intensity) of traffic sinks/sources per site. For example, devices may be deployed in a distributed manner based at least in part on specific traffic flows. An embodiment of the present invention recognizes that some links and/or pairs of nodes may be more heavily loaded than others. An embodiment of the present invention also understands that device usage may be affected by the end user, type of user, application, environment and/or other factors.

Accordingly, an embodiment of the present invention provides improved network balancing for enhanced performance and better use of resources.

Figure 1:
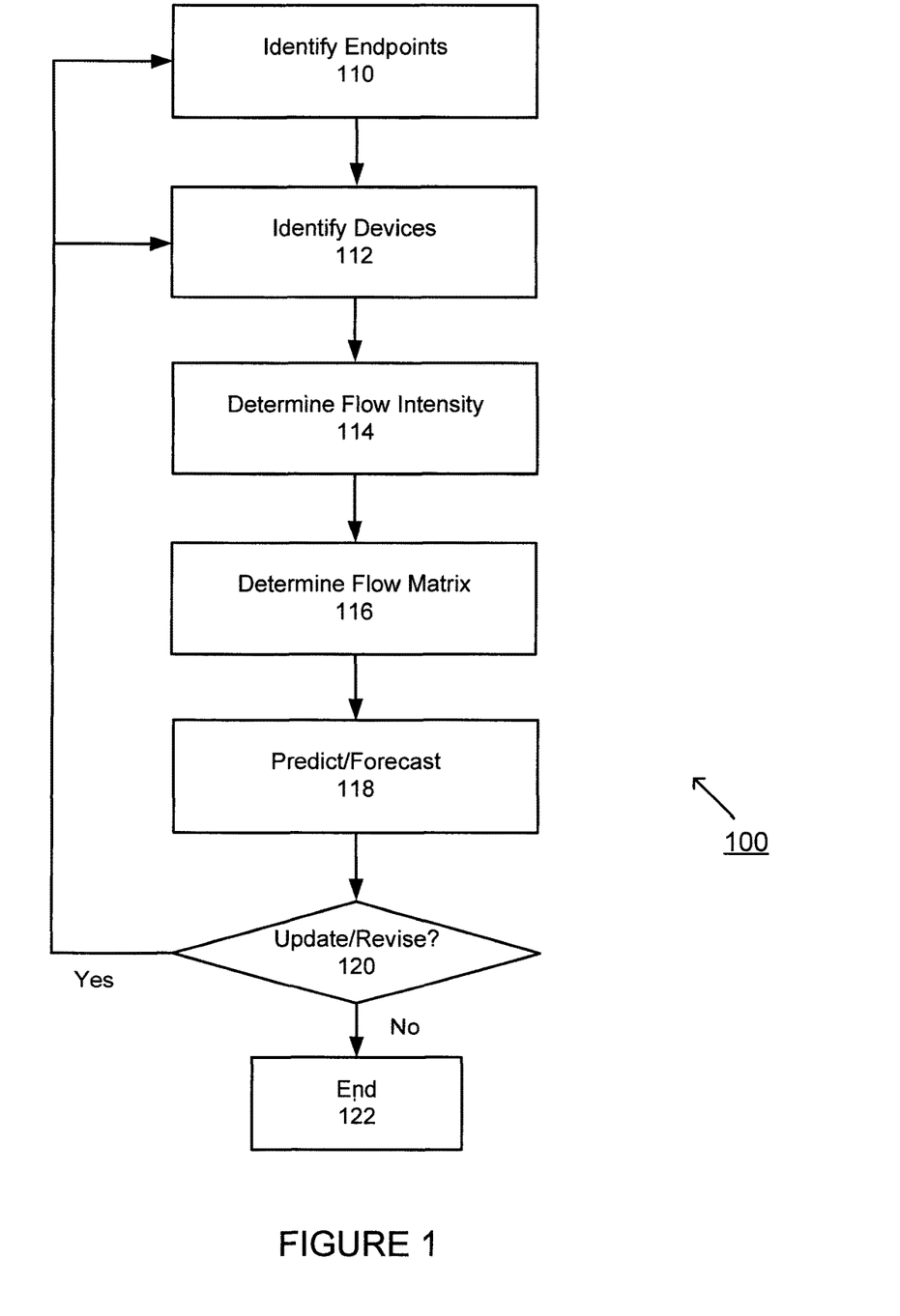
FIG. 1 is an exemplary flowchart of a method for determining traffic flows for network capacity planning, according to an embodiment of the present invention.

FIG. 1 is an exemplary flowchart of a method for determining traffic flows for network capacity planning, according to an embodiment of the present invention. Traffic flows may be determined for various types of communication devices that provide and/or exchange data, including voice, data, interactive data, video, social media and/or various combinations and variations thereof. The system and method of an embodiment of the present invention may be applied to video systems on WAN links, Voice over IP (VoIP) deployments and other types of applications, whether real-time or non-real-time. At step 110, end points for a link within a network may be identified. At step 112, a determination of a number of devices and/or other characteristic may be made. At step 114, flow intensity may be determined. At step 116, a flow matrix may be determined. At step 118, the flow matrix may be applied to a model for prediction or forecasting. At step 120, the endpoints and/or devices may be revised and/or updated. The order illustrated in FIG. 1 is merely exemplary. While the process of FIG. 1 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 110, end points for a link may be identified. An exemplary system may comprise multiple communication links, e.g., tens, hundreds, thousands of communication links. For each link, end points may be identified. The process of FIG. 1 may be applied for an individual link between endpoints and for a plurality of links within a network or larger system. For example, the methodology may be used to update one or more links as well as configure and/or reconfigure an entire system.

At step 112, a determination of a number of devices and/or other characteristic may be made for each end point of the link. For example, an embodiment of the present invention may identify the number of communication devices at each end point. Also, the number and/or type of users may be identified. Also, an embodiment of the present invention may further categorize the type of devices, such as voice devices, interactive devices, video devices, processing devices, data storage devices, backend devices, etc. The type of device may be related to how the device is used and/or intended or expected to be used. The type of users may be identified, where the type or identity of a user may identify how often the user uses a particular device or category of device. For example, IT groups may use devices more than other users. The user's identity, privilege, profile, permissions and/or role may also be considered. Other considerations may be applied, which may include time of day, weekday, weeknight, holiday season, busy season, important events, mission critical tasks, power outages, storms, blackouts, etc. In addition, the type of business may be considered, e.g., technology company, merchant, education facility, marketing agency, etc.

At step 114, a flow intensity for the endpoints and/or link may be determined. An embodiment of the present invention recognizes that flow intensity may be (directly or indirectly) proportional to the number of devices. For example, an exemplary application may apply a percentage to the total number of devices to determine usage at a particular end point. In this example, an embodiment of the present invention may recognize that at any given time (during operating hours), 20% of all phones are in use. An embodiment of the present invention may apply a variable percentage to account for variances in usage during the day. For example, for a particular entity, an embodiment of the present invention may recognize that many calls are made between the hours of 9:00 am to 11:30 am, with a break between 11:30 to 1:30 pm, and where a majority of the calls are made during 3:00 to 5:00 pm. In this example, a variable percentage or an average percentage may be applied to the number of devices or eligible devices. Other variations may be implemented.

According to another example, the flow intensity may be based on various factors, including those determined at step 112. The flow intensity may represent an amount of data passing through an endpoint, or device. The flow intensity may be represented in terms of Mbps, for example. In telecommunications, data transfer rate may represent an average number of bits (bitrate), characters or symbols (baudrate), or blocks (packet rate) per unit time passing between equipment in a data transmission system. Measurements of data transfer rate may be represented in unit bits per second (bps) or multiples of bits per second, such as megabits per second (Mbps). Other units of measure may be used. The flow intensity may also be identified based on historical data, prediction algorithms, comparisons with similar devices and/or environments. Also, the operation of one device (which may be a communication device or not) may affect the performance or operation of another device. An embodiment of the present invention may consider and recognize the interoperability of various devices when determining flow intensity.

At step 116, a flow matrix may be determined. An embodiment of the present invention may make flow intensities proportional to traffic intensities. For example, a flow matrix for traffic intensity between two points may be represented as the product of the each intensity with respect to the total intensity between the end points. Specifically, the flow intensity $M_{ij}$ between end points A and B is proportional to their overall traffic intensities $x_i$ and $x_j$.

At step 118, the flow matrix may be applied to a model for prediction or forecasting. For example, the flow matrix may be provided to a network capacity planning tool to create balanced flows for network planning.

At step 120, revisions may be applied to endpoints and/or devices. For example, the deployment may be revised and/or updated for a particular link, group of links and/or for an entire system or network.

Figure 2:
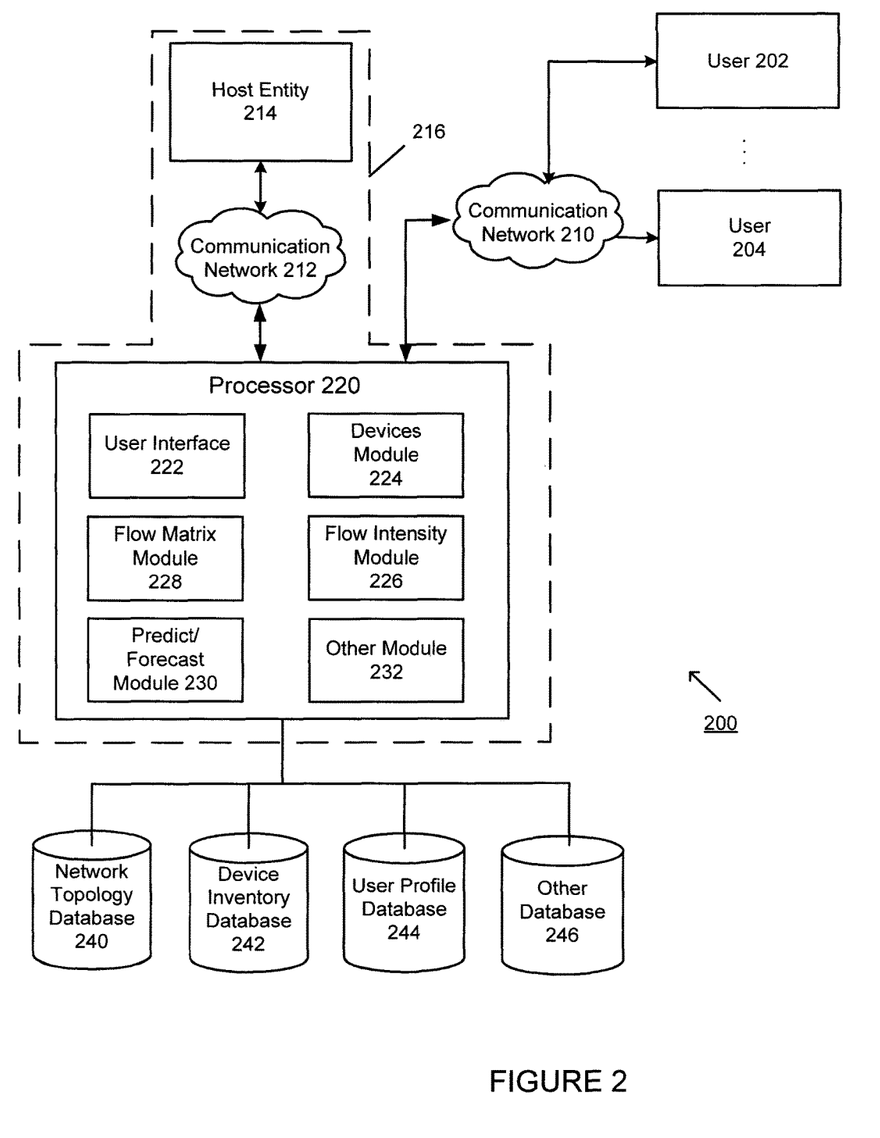
FIG. 2 is an exemplary detailed diagram of a system for determining traffic flows for network capacity planning, according to an embodiment of the present invention.

FIG. 2 is an exemplary detailed diagram of a system for determining traffic flows for network capacity planning, according to an embodiment of the present invention. An embodiment of the present invention may be directed to an automated tool for determining traffic flows for various systems and communication links. A system 200 of an embodiment of the present invention may include a Processor 220. The Processor 220 may be available via a web interface or other user interface. As illustrated in FIG. 2, Processor 220 may be accessed by users, including engineers, system managers and other users via a user communication device associated with a user accessing a centralized system of an embodiment of the present invention. The user may establish a communication session with a communication device via a communication network 210.

Processor 220 may be stand alone or hosted by an entity, such as a financial institution, service provider, corporation, company, facility, merchant, bank, etc. For example, Processor 220 may be affiliated or associated with a host entity and/or other entity. In an exemplary embodiment involving a Host Entity 214 may host or support Processor 220. In this example, the application of traffic flows determination of an embodiment of the present invention may appear to be performed by a host entity, as a single consolidated unit, as shown by 216.

According to another example, Processor 220 may be separate and distinct from Host Entity 214. For example, Host Entity 214, or other entity, may communicate to Processor 220 via a network or other communication mechanism, as shown by Communication Network 212.

Processor 220 may access databases and/or other sources of information to perform analysis and process data. Processor 220 may access and/or maintain Network Topology Database 240, Device/Inventory Database 242, User Profile Database 244, and Other Database 246. For example, Network Topology Database 240 may include information relating to various topologies for various systems and networks. This database may also include information relating to layout, floor plans and may further include location of employees, contractors, equipment, resources, network elements, etc. Information on each floor, team or subset may also be available. This database may include information regarding specifics of the network, load, performance, demand, etc. This information may be specific for location, floor, team, etc. Device/Inventory Database 242 may maintain information on equipment, devices, resources, usage, location, historical data and other device specific information. For example, this database may include information regarding connectivity, neighboring devices, links, endpoints, information about nodes, etc. User Profile Database 244 may include information for users, preferences, privileges, etc. While a single database is illustrated in the exemplary figure, the system may include multiple databases at the same location or separated through multiple locations. The databases may be further combined and/or separated. In addition, the databases may be supported by Host Entity 214 or an independent service provider. For example, an independent service provider may support the one or more databases and/or other functionality at a remote location. Other architectures may be realized. The components of the exemplary system diagrams may be duplicated, combined, separated and/or otherwise modified, as desired by various applications of the embodiments of the present invention as well as different environments and platforms.

Processor 220 may include various modules and interfaces for analyzing the impact of deploying various systems, according to an embodiment of the present invention. Processor 220 may include User Interface 222, Devices Module 224, Flow Intensity Module 226, Flow Matrix Module 228, Predict/Forecast Module 230, and/or other modules, interfaces and/or processors, as represented by Other Module 232. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

According to another embodiment of the present invention, Processor 220 may host a website or other electronic interface where users may access data as well as provide data. For example, a user may submit and access information through User Interface 222 to view data, submit requests, provide data and/or perform other actions. Processor 220 may communicate with various entities via communication network 210. For example, Processor 220 may receive inputs from users, shown by 202 and 204. For example, User Interface 222 may provide reports, alerts, and/or other forms of output for the user. Also, User Interface 222 may provide a user interactive display that illustrates a topology with flows graphically displayed. User Interface 222 may also provide a link usage visualization feature that enables a user to perform link analysis, such as link failure analysis. Other types of analysis and planning may be performed via User Interface 222.

An embodiment of the present invention may assign priorities to certain types of traffic, data, conversation, video, etc. The priorities may be considered when determining traffic flows. For example, some traffic may be considered operation mission critical. To a financial institution, the ability to process credit card transactions may be protected. Also, the ability to support telephone calls may be deemed essential. The type of user may also impact the importance of the data. For example, the CEO and upper management as well as IT personal may be considered critical users.

Devices Module 224 identifies devices in a network. For example, the number of devices may be identified. The devices may also be categorized by type, usage, location, etc. For example, some types of communication device may require more processing and/or usage than others. However, telephones and computers may transmit and receive more data during peak working hours than other devices that may transmit/receive data on a nightly basis. Devices Module 224 may also identify the user or users of the device. The identity or type of user may provide insight into the level of usage. For example, an IT manager may require constant access to data and/or other processing functionality. Also, an embodiment of the present invention may learn or otherwise identify how a particular user or group of users transmit and/or receive data.

Flow Intensity Module 226 determines flow intensity for a device, an end point, etc. The flow intensity may be proportional to the devices identified in Devices Module 224. For each device, transmit flow intensity and receive flow intensity may be calculated. The flow intensity may be determined based on the number of devices. According to another example, other factors may be considered in determining flow intensity. According to an exemplary embodiment, weights or other factors may be applied to devices for accommodate for varying usage. For example, a particular type of user and/or type of device may warrant a higher intensity. Also, a category of user or device may be assigned a lower intensity. Other tools for identifying flow intensity may be applied.

The flow intensity calculation may be directly or indirectly proportional to the number of devices. For example, a predetermined or variable percentage (or other calculation) may be applied to the total number of devices to ascertain a flow intensity. Other methodologies and/or calculations may be applied. According to another example, various factors may be considered for the flow intensity, including user, geography, application, company type, historical data, etc.

The geographic location and/or type of environment may also affect flow intensity. For example, a hospital and dispatch center may expect higher flow intensities as opposed to another establishment that uses devices on a far less scale (e.g., restaurant or convenient store). The number of employees (and in particular, certain types of employees) may also have an effect on the intensity calculations. Historical usage and other relevant data may be used to identify flow intensities.

An embodiment of the present invention may consider privileges assigned to users, employees, members or participants. For example, different members may be given priority over others. The president of a company may be given priority over entry level employees. A company may assign employees different level of services. For example, employees with communication roles may have a higher usage than most general users within a company.

An embodiment of the present invention may consider certain qualities of traffic that may require additional processing and/or resources. For example, additional resources may be needed to determine whether data is encrypted or not and to further decrypt and/or encrypt the data. Number of participants and their associated preferences as well as location specific data may also be considered. Other forms of data may also include interactive data, as well as data associated with social media sites, real time chat, etc.

Figure 3:
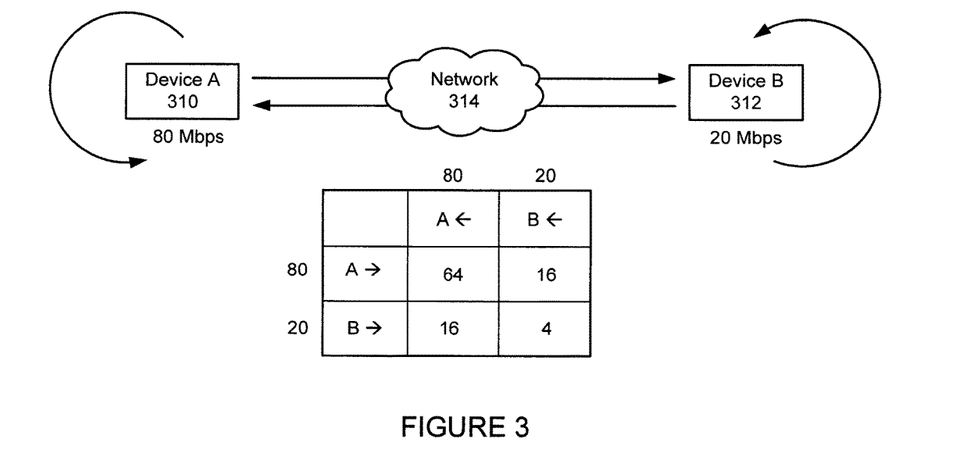
FIG. 3 is an example of a flow matrix, according to an embodiment of the present invention.
Figure 4:
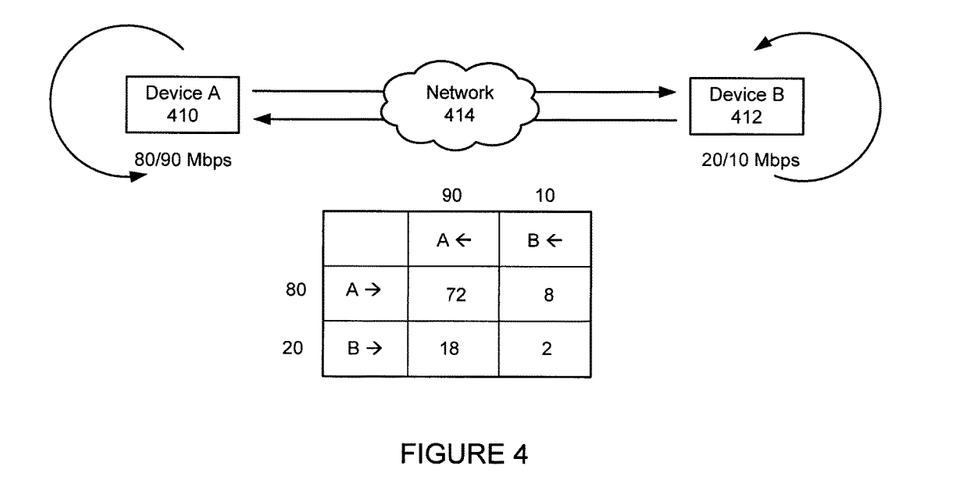
FIG. 4 is an example of a flow matrix, according to an embodiment of the present invention.
Figure 5:
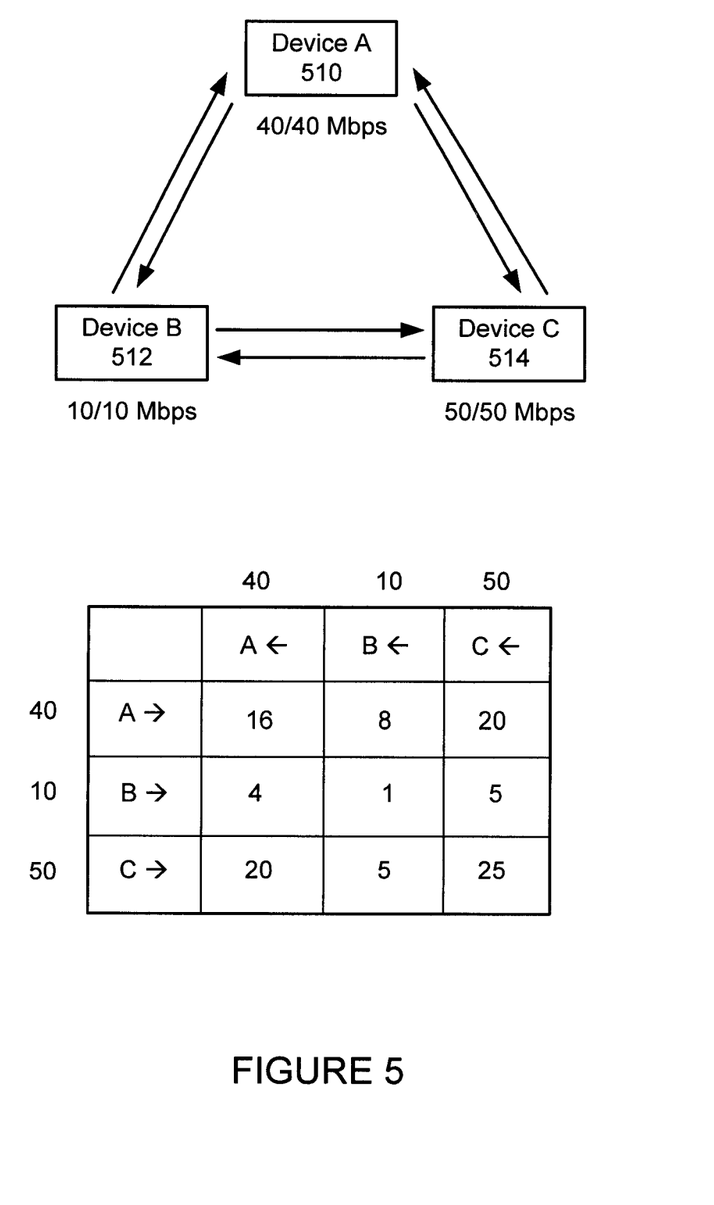
FIG. 5 is an example of a flow matrix, according to an embodiment of the present invention.

Flow Matrix Module 228 may calculate a flow matrix between end points. The calculation may make the flow intensity proportional to traffic intensities. The flow matrix calculation takes into consideration the traffic intensities at each endpoint. FIGS. 3, 4 and 5 below provide illustrative flow matrix specifics.

Predict/Forecast Module 230 may provide feedback to the user regarding how the network is handling the current load. For example, a graphical user interface, such as a dashboard, icon, etc., may be displayed and provide codes, including color codes indicating different status and requesting action in response. Also, a warning or other alarm may indicate an impending critical situation that may require some type of action or acknowledgement. Also, Predict/Forecast Module 230 may include a reporting functionality where users may generate graphics, reports and view trends and historical data. A snapshot capability may capture specifics for each deployment, which may be transmitted to other users for verification and confirmation.

For example, a user may anticipate a need for additional resources for an event, meeting, presentation, etc. In this example, additional capabilities and/or equipment may be needed. For example, overseas communications may require additional resources.

Also, Predict/Forecast Module 230 may apply the calculated flow matrix. For example, according to an exemplary embodiment, the calculated flows may serve as an input to a network capacity planning tool. An embodiment of the present invention is directed to creating balanced flows for network planning, e.g., VoIP flow planning. Also, an embodiment of the present invention may update and reconfigure specific flows after deployment. For example, a specific link may be identified for update. Also, a geographic area, building, floor, room, etc. may be identified where the associated devices, nodes, etc. may be updated accordingly. Other administrative functions may be provided.

FIG. 3 is an example of a flow matrix, according to an embodiment of the present invention. An exemplary application is directed to a solution for symmetric sink/source systems. Given a set of n traffic sinks/sources, where k-th sink/source may receive and transmit with intensity of $x_k$—a flow matrix M for traffic intensity between two points i→j may be represented as follows:

$$M_{ij} = x_i x_j \bigg/ \left(\sum_{k=1}^{n} x_k\right)$$

Total traffic transmitted from point i may be calculated as follows:

$$\sum_{k=1}^{n} M_{ij} = x_i \left(\sum_{j=1}^{n} x_j\right) \bigg/ \left(\sum_{k=1}^{n} x_k\right) = x_i$$

For received traffic note that $M_{ji}=M_{ij}$. In this example, flow intensity $M_{ij}$ between sites i and j is proportional to their overall traffic intensities $x_i$ and $x_j$.

As shown in FIG. 3, device A and device B are connected via a communication link. Based on the number of devices and/or other characteristics, an intensity of device A is calculated to be 80 Mbps while device B has an intensity of 20 Mbps. Flow matrix is shown at 320. Accordingly, a first site A is capable of receiving/transmitting 80 Mbps and a second site B is capable of receiving/transmitting 20 Mbps.

The flow matrix represents how much traffic goes through each respective end point. In this example, the flow between A→A is represented by $M_{11}$, which is calculated as 80*80/100=64. This represents the flow intensity for devices that communicate with each other at the same site, e.g., how much devices talk to each other at site A. The flow between A→B is represented by $M_{12}$, which is calculated as 80*20/100=16. The flow between B→A is represented by $M_{21}$, which is calculated as 20*80/100=16. These intensities represent communication over Network 314 between A and B. The flow between B→B is represented by $M_{22}$, which is calculated as 20*20/100=4. This represents the flow intensity for devices that communicate with each other at the same site, e.g., how much devices talk to each other at site B.

This solution may be represented as $$\sum_{j=1}^{n} M_{ij} = x_i.$$

The flow matrix may then be applied to a topology.

FIG. 4 is an example of a flow matrix, according to an embodiment of the present invention. According to another example, a peak concurrency, such as 20%, may be applied. An embodiment of the present invention may also be applied to asymmetric sink/source systems. Given a set of n traffic sinks/sources, where k-th sink/source may transmit $x_k$ and receive $y_k$, and where the total received traffic equals the total transmit traffic:

$$\left(\sum_{k=1}^{n} x_k\right) / \left(\sum_{k=1}^{n} y_k\right) = \sum$$

In this example, device A transmits at 80 Mbps and receives at 90 Mbps whereas device B transmits at 20 Mbps and receives at 10 Mbps. As shown in FIG. 4, a flow matrix M for traffic intensity between two points i→j may be represented as:

$$M_{ij} = x_i y_j / \Sigma$$

In this example, the flow between A→A is represented by $M_{11}$, which is calculated as 80*90/100=72. The flow between A→B is represented by $M_{12}$, which is calculated as 80*10/100=8. The flow between B→A is represented by $M_{21}$, which is calculated as 20*90/100=18. These intensities represent communication over Network 414 between A and B. The flow between B→B is represented by $M_{22}$, which is calculated as 20*10/100=2.

An embodiment of the present invention may be used as an integral part of core network capacity planning. The methodology for traffic flow creation may be used as a standalone system or may be integrated as part of a larger platform.

According to another example, an embodiment of the present invention may be applied to audio, VoIP, wireless video, data, interactive data and other communication technology. While an embodiment of the present invention is described with respect to communication links, other networks may be considered. Moreover, while the detailed description is directed to an exemplary application involving traffic flows, the various embodiments of the invention may be applied to other scenarios and applications involving flow analysis and deployment. Other applications may be applied in varying scope. The flow matrix may then be applied to a topology.

FIG. 5 is an example of a flow matrix, according to an embodiment of the present invention. In this example, three exemplary end points are shown with data flows between endpoints A and B, endpoints B and C and endpoints A and C. In this example, device A transmits at 40 and receives at 40, device B transmits at 10 and receives at 10 whereas device C transmits at 50 and receives at 50.

In this example, the flow between A→A is represented by $M_{11}$, which is calculated as 40*40/100=16. The flow between A B is represented by $M_{12}$, which is calculated as 40*10/100=4. The flow between A→C is represented by $M_{13}$, which is calculated as 40*50/100=20.

The flow between B→A is represented by $M_{21}$, which is calculated as 10*40/100=4. The flow between B→B is represented by $M_{22}$, which is calculated as 10*10/100=1. The flow between B→C is represented by $M_{23}$, which is calculated as 10*50/100=5.

The flow between C→A is represented by $M_{31}$, which is calculated as 50*40/100=20. The flow between C→B is represented by $M_{32}$, which is calculated as 50*10/100=5. The flow between C→C is represented by $M_{33}$, which is calculated as 50*50/100=25.

An embodiment of the present invention may be applied to various topologies and networks between a few end points to a much larger scale involving hundreds, thousands or more devices and communication links. The examples of FIGS. 3-5 are merely exemplary.

Figure 6:
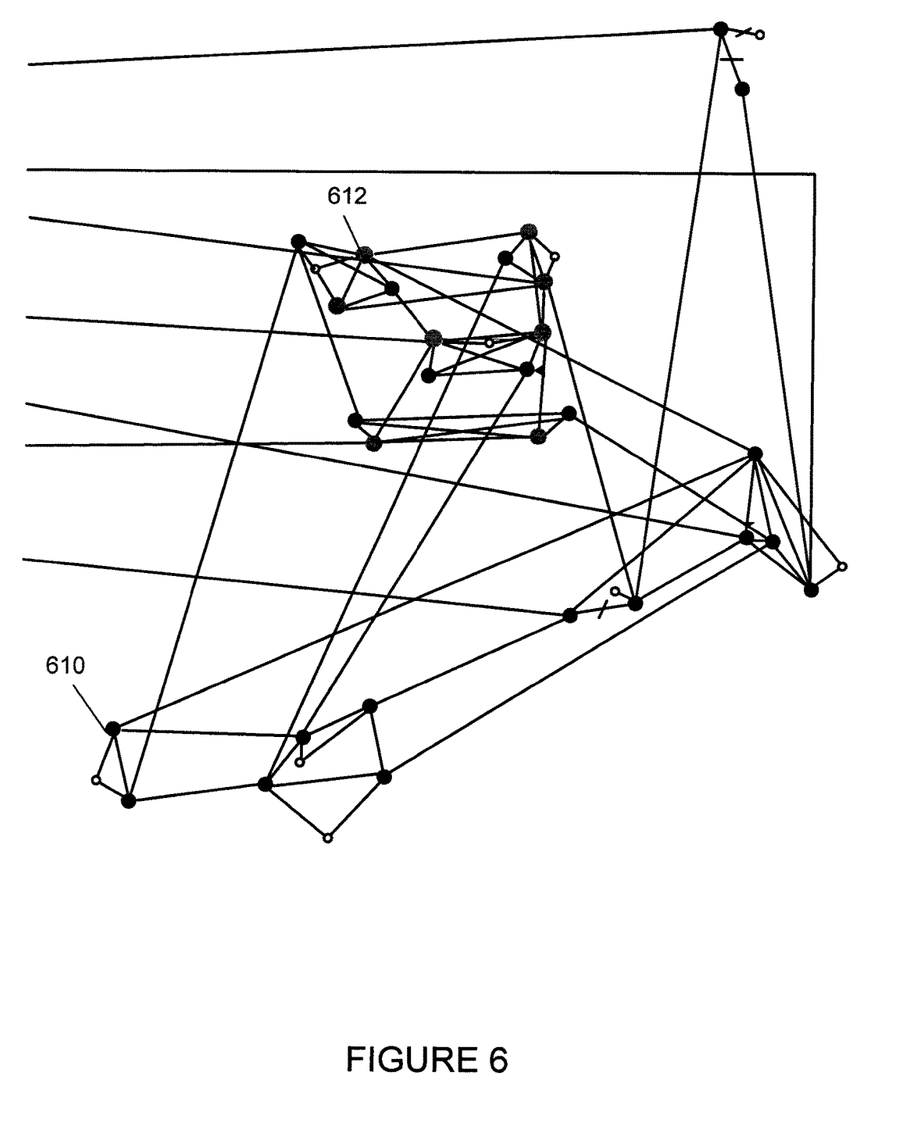
FIG. 6 is an exemplary screenshot of a core topology, according to an embodiment of the present invention.

FIG. 6 is an exemplary screenshot of a core topology, according to an embodiment of the present invention. FIG. 6 is an exemplary network with various nodes, which may include edge nodes, internal nodes, routers, etc. In this example, the darker nodes may represent internal nodes while the grey nodes may represent provider edge devices. Other variations of nodes and/or devices may be represented in varying detail. The nodes may further connect to customer edge devices and/or other devices, such as computers, servers, phones, databases, etc. The links between the nodes represent communication links. The network may be between nodes within a network of varying scale. For example, nodes may be within a company, across the street, distributed throughout multiple cities, overseas, etc.

Figure 7:
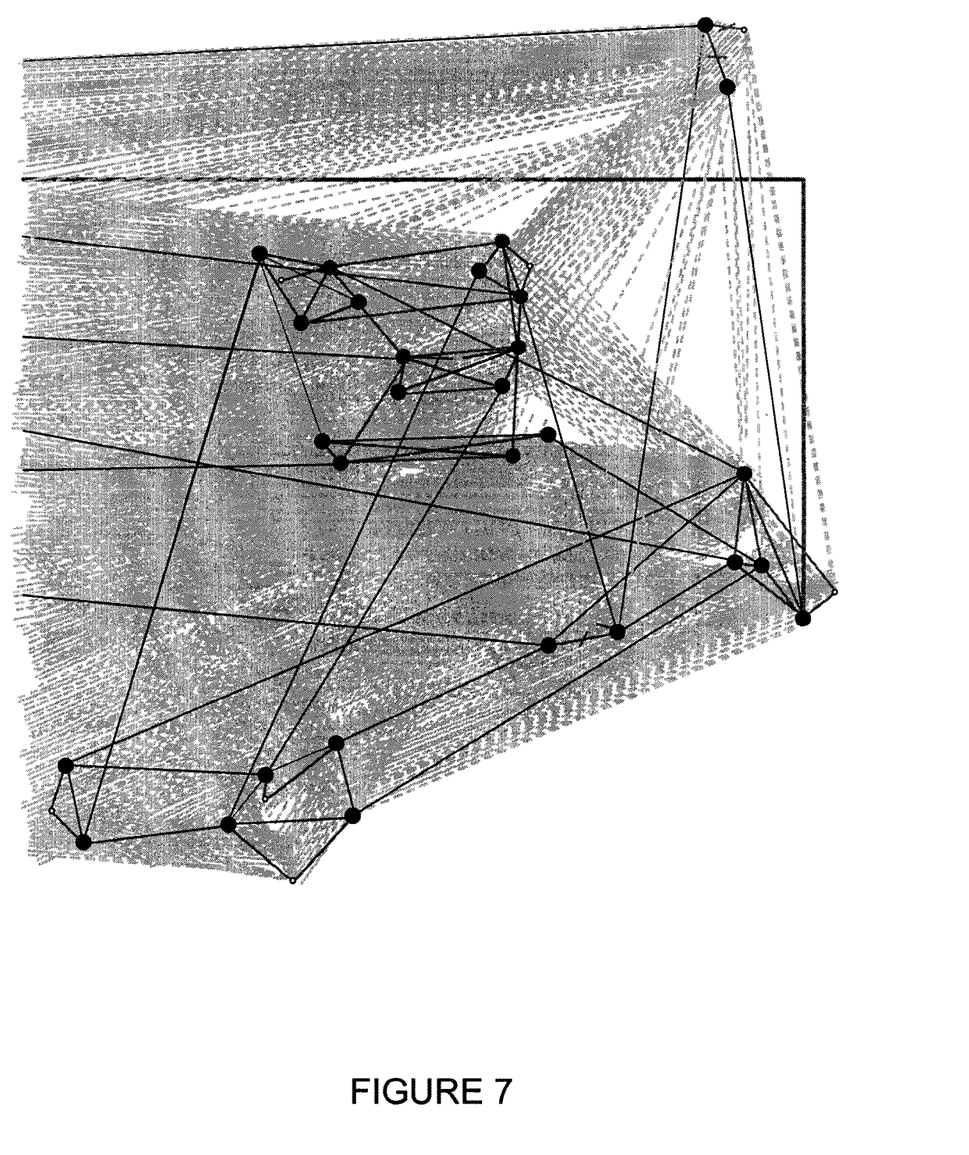
FIG. 7 is an exemplary screenshot of a core topology with data flows, according to an embodiment of the present invention.

FIG. 7 is an exemplary screenshot of a core topology with data flows, according to an embodiment of the present invention. FIG. 7 illustrates a mesh of flows for the network shown in FIG. 6. The flows represent network routes through network devices. For each flow, there is an associated time and load. FIG. 7 represents a description of traffic intensity for the network shown in FIG. 6.

Figure 8:
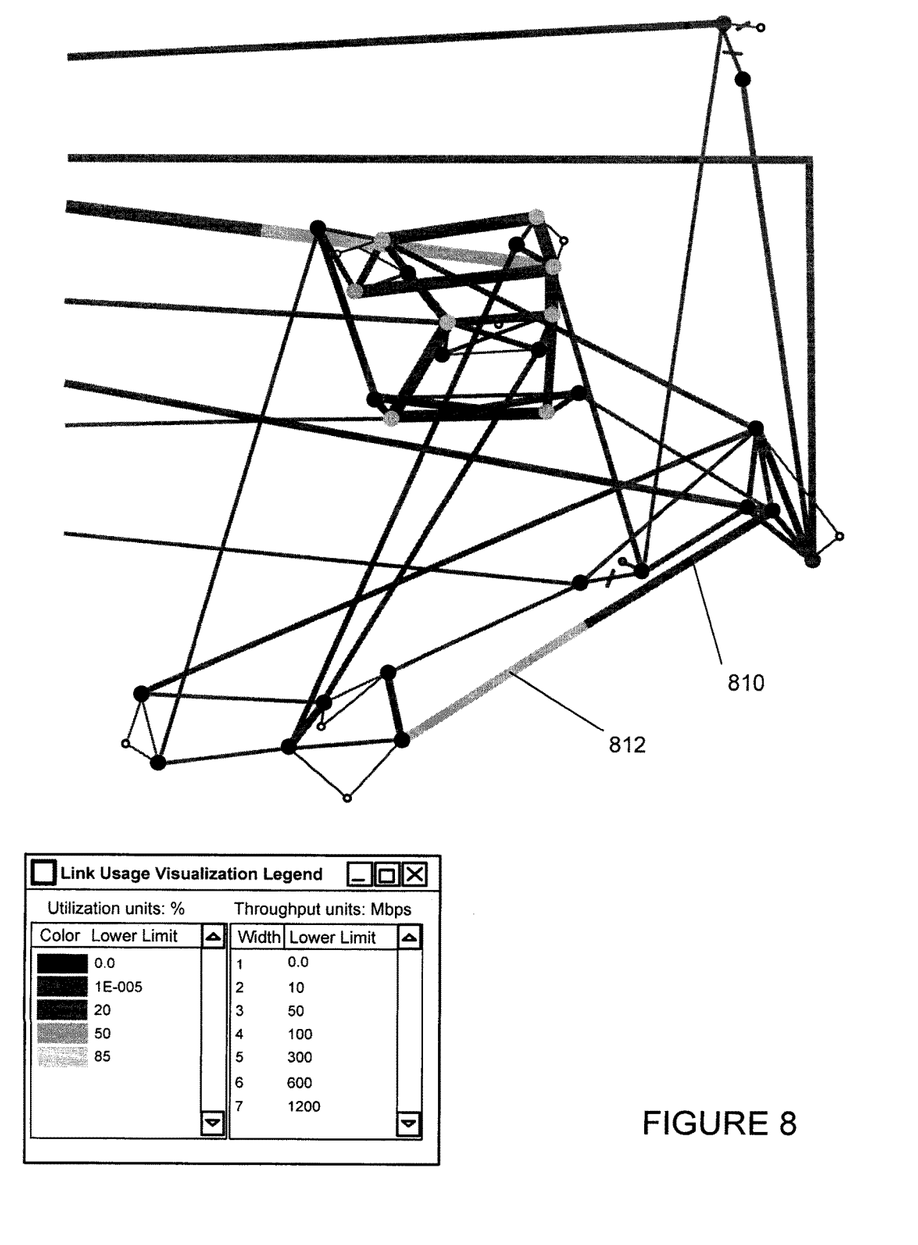
FIG. 8 is an exemplary screenshot of a data flow intensities, according to an embodiment of the present invention.

FIG. 8 is an exemplary screenshot of a data flow intensities, according to an embodiment of the present invention. As shown in FIG. 8, the link usage visualization view illustrates how much the communication links are utilized. FIG. 8 enables a user to perform analysis on the loads and links. For example, a user may perform failure analysis. In this example, a user may identify a utilized link for failure to see how the other surrounding and even remote links behave, e.g., do any of the links approach over utilization or failure when a particular link is flagged. FIG. 8 further graphically illustrates the throughput units in terms by varying thickness of the links A link having a low width represents low throughput while a higher width represents a larger load on the link.

An exemplary application an embodiment of the present invention may include redeployment in response to disaster recovery or other event. For example, a building in a major city may experience a partial or complete shutdown. As a result, communication links may need to be redeployed. Using an interface of an embodiment of the present invention, a user may identify links to remove (or otherwise render inactive) and determine how traffic flows can be rerouted. An embodiment of the present invention enables a user to see which links may be vulnerable to overheating and then plan accordingly, by adding more links, adjusting the size of the links, etc.

While the exemplary embodiments illustrated herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by Processor 220, as shown by FIG. 2 may be stored and cataloged in Databases 240, 242 and 246, which may comprise or interface with a searchable database. Databases 240, 242 and 246 may comprise, include or interface to a relational database. Other databases, such as a query format database, a Standard Query Language (SQL) format database, a storage area network (SAN), or another similar data storage device, query format, platform or resource may be used. Databases 240, 242 and 246 may comprise a single database or a collection of databases, dedicated or otherwise. In one embodiment, Databases 240, 242 and 246 may store or cooperate with other databases to store the various data and information described herein. In some embodiments, Databases 240, 242 and 246 may comprise a file management system, program or application for storing and maintaining data and information used or generated by the various features and functions of the systems and methods described herein. In some embodiments, Databases 240, 242 and 246 may store, maintain and permit access to customer information, transaction information, account information, and general information used to process transactions as described herein. In some embodiments, Databases 240, 242 and 246 is connected directly to Processor 220, which, in some embodiments, it is accessible through a network, such as communication network, e.g., 210, 212 illustrated in FIG. 2, for example.

Communications network, e.g., 210, 212 in FIG. 2, may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communications network, e.g., 210, 212, may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 210 and 212 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network, e.g., 210, 212, may comprise a satellite communications network, such as a direct broadcast communication system (DBS) having the requisite number of dishes, satellites and transmitter/receiver boxes, for example. Communications network, e.g., 210, 212, may also comprise a telephone communications network, such as the Public Switched Telephone Network (PSTN). In another embodiment, communication network 120 may comprise a Personal Branch Exchange (PBX), which may further connect to the PSTN.

In some embodiments, Processor 220 may include any terminal (e.g., a typical home or personal computer system, telephone, personal digital assistant (PDA) or other like device) whereby a user may interact with a network, such as communications network, e.g., 112. 114, for example, that is responsible for transmitting and delivering data and information used by the various systems and methods described herein. Processor 220 may include, for instance, a personal or laptop computer, a telephone, or PDA. Processor 220 may include a microprocessor, a microcontroller or other general or special purpose device operating under programmed control. Processor 220 may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Processor 220 may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Processor 220 may also include a network-enabled appliance, a browser-equipped or other network-enabled cellular telephone, or another TCP/IP client or other device.

As described above, FIG. 2 shows embodiments of a system of the invention. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, RUM Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. An automated computer implemented method for determining balanced traffic flows for network capacity planning, wherein the method is executed by a programmed computer processor which communicates with a user via a network, the method comprising the steps of:

automatically identifying, via a computer processor, a first current device count configuration for a first end point and a second current device count configuration for a second end point where the first end point forms a communication link with the second end point where the communication link is part of a network, the first current device count configuration comprises each of: a number of communication devices, a count of devices within a device category, a number of users and a count of users within a user type at the first end point and the second current device count configuration comprises each of: a number of communication devices, a count of devices within a device category, a number of users and a count of users within a user type at the second end point;

determining, via a computer processor, a first flow intensity for the first end point based at least in part on the first current device count configuration wherein the first flow intensity comprises a first transmit intensity and a first receive intensity for the first end point;

determining, via a computer processor, a second flow intensity for the second end point of the communication link based at least in part on the second current device count configuration wherein the second flow intensity comprises a second transmit intensity and a second receive intensity for the second end point;

generating, via a computer processor, a flow matrix for the communication link where the flow matrix is proportional to the first flow intensity of the first end point and the second flow intensity of the second end point;

transmitting, via a computer processor, the flow matrix to a network capacity planning tool for flow matrix deployment for the network;

applying, via a computer processor, the flow matrix to generate a core topology with edge nodes, internal nodes and corresponding data flow intensities; and displaying, via a graphical user interface, the core topology with the edge nodes, the internal nodes and the corresponding data flow intensities.

2. The method of claim 1, wherein the first and second current device count configuration further comprises usage information for each end point.

3. The method of claim 1, wherein the graphical user interface further graphically displays link usage information.

4. The method of claim 1, wherein the graphical user interface further provides the ability to perform failure analysis.

5. The method of claim 1, further comprising the step of: updating the flow matrix of at least one communication link within the network.

6. The method of claim 1, wherein the first and second end points comprise a combination of internal end points and provider edge devices.

7. An automated computer implemented system for determining balanced traffic flows for network capacity planning, wherein the system comprises a programmed computer processor which communicates with a user via a network, wherein the system comprises a device module comprising a computer processor configured to automatically identify a first current device count configuration for a first end point and a second current device count configuration for a second end point where the first end point forms a communication link with the second end point where the communication link is part of a network, the first current device count configuration comprises each of: a number of communication devices, a count of devices within a device category, a number of users and a count of users within a user type at the first end point and the second current device count configuration comprises each of: a number of communication devices, a count of devices within a device category, a number of users and a count of users within a user type at the second end point;

a flow intensity module comprising a computer processor configured to determine a first flow intensity for the first end point based at least in part on the first current device count configuration wherein the first flow intensity comprises a first transmit intensity and a first receive intensity for the first end point; and further configured to determine a second flow intensity for the second end point of the communication link based at least in part on the second current device count configuration wherein the second flow intensity comprises a second transmit intensity and a second receive intensity for the second end point;

a flow matrix module comprising a computer processor configured to determine a flow matrix for the communication link where the flow matrix is proportional to the first flow intensity of the first end point and the second flow intensity of the second end point; and a graphical user interface configured to provide the flow matrix to a network capacity planning tool for flow matrix deployment for the network; configured to apply the flow matrix to generate a core topology with edge nodes, internal nodes and corresponding data flow intensities; and further configured to display the core topology with the edge nodes, the internal nodes and the corresponding data flow intensities.

8. The system of claim 7, wherein the first and second current device count configuration further comprises usage information for each end point.

9. The system of claim 7, wherein the graphical user interface further graphically displays link usage information.

10. The system of claim 7, wherein the graphical user interface further provides the ability to perform failure analysis.

11. The system of claim 7, wherein the flow matrix of at least one communication link within the network is updated.

12. The system of claim 7, wherein the first and second end points comprise a combination of internal end points and provider edge devices.

* * * * *